United States Patent [19]
Huckabee

[11] Patent Number: 5,752,408
[45] Date of Patent: *May 19, 1998

[54] SUPPORT STRUCTURE FOR AUTOMOTIVE BODY REPAIR

[76] Inventor: Donnie L. Huckabee, 4331 Yender Ave., Lisle, Ill. 60532

[*] Notice: The terminal 13 months of this patent has been disclaimed.

[21] Appl. No.: 283,54

[22] Filed: Aug. 1, 1994

[51] Int. Cl.[6] ........................................ B21C 3/06
[52] U.S. Cl. .................................. 72/483; 72/705
[58] Field of Search ..................... 72/705, 295, 298, 72/305, 483; 269/237, 296, 297, 402.01, 402.03, 402.08

[56] References Cited

U.S. PATENT DOCUMENTS

| | | | |
|---|---|---|---|
| 3,149,659 | 9/1964 | Bogett, Jr. | 72/705 |
| 3,214,959 | 11/1965 | Bowder | 72/483 |
| 3,835,693 | 9/1974 | Majersky | 72/705 |
| 4,516,423 | 5/1985 | Reich | 269/239 |
| 4,534,200 | 8/1985 | Celette | 72/305 |
| 5,328,161 | 7/1994 | Stuck | 269/296 |

*Primary Examiner*—Daniel C. Crane
*Assistant Examiner*—Ed Tolan
*Attorney, Agent, or Firm*—John L. Schmitt

[57] ABSTRACT

Support structure for carrying a vehicle body comprises a pair of spaced apart frames positioned about a front and rear end of the vehicle body. Each frame has an octagon shape formed by joined elongated members. A cross bar assembly of each frame includes a pair of sleeve supports positioned on side members of the frame body and a center member pivotally carried by the sleeve supports. Latching mechanisms at ends of the cross bar assembly limit the degree of center member rotation with respect to the frame body. During use the frames are positioned horizontally so that bottom sections may be slid under respective slightly raised ends of the vehicle body. Mounts on each cross bar assembly then are attached to mounting structure of the vehicle. Next, a top member of one frame is lifted upward which rotates the frame body and lifts that end of the vehicle body. When vertical, its latching mechanisms activate to inhibit further frame movement. Bracing carried by the frame then is attached to the vehicle body. The other frame then is lifted in a like manner. Lastly, bracing of the other frame is attached to the body and cross bracing attached between frames. The support structure and vehicle body now may be rolled over to locate the body as required to facilitate its repair or restoration.

12 Claims, 3 Drawing Sheets

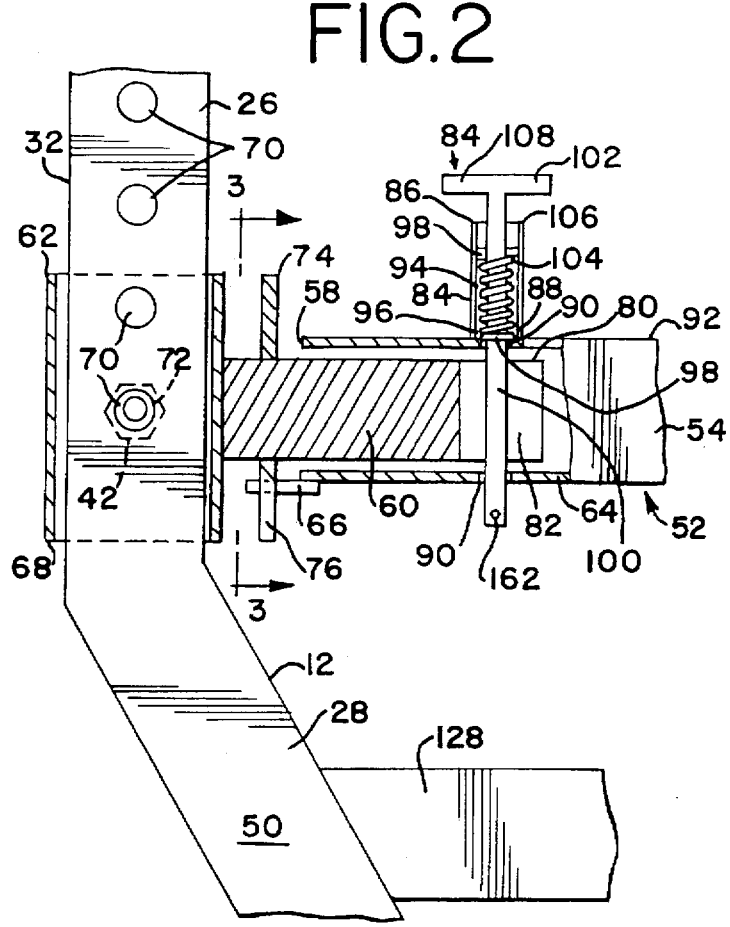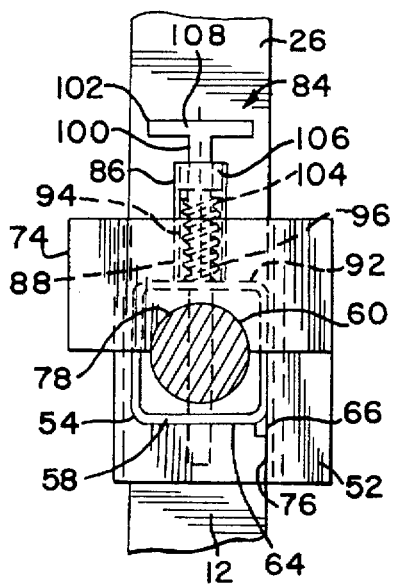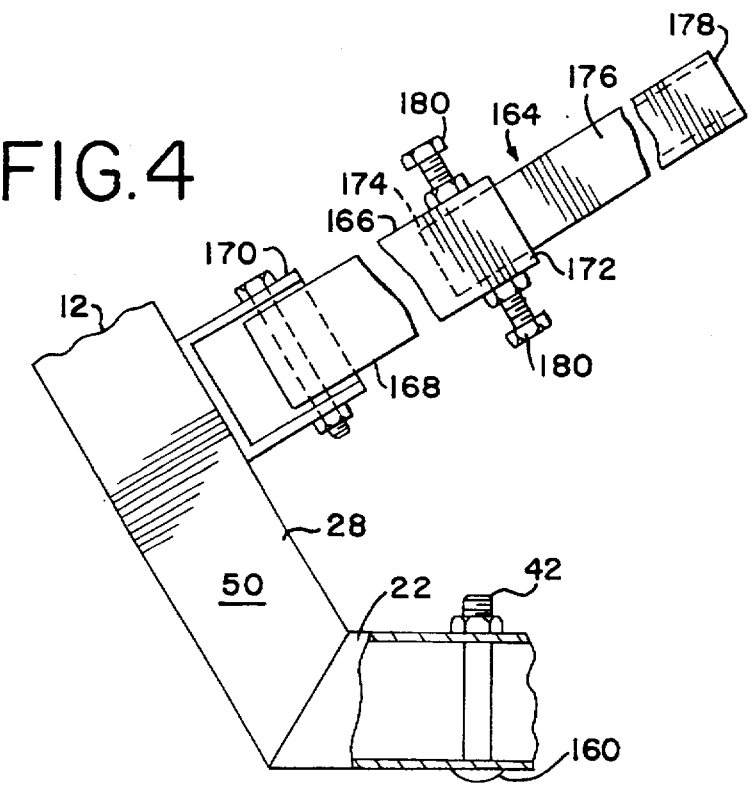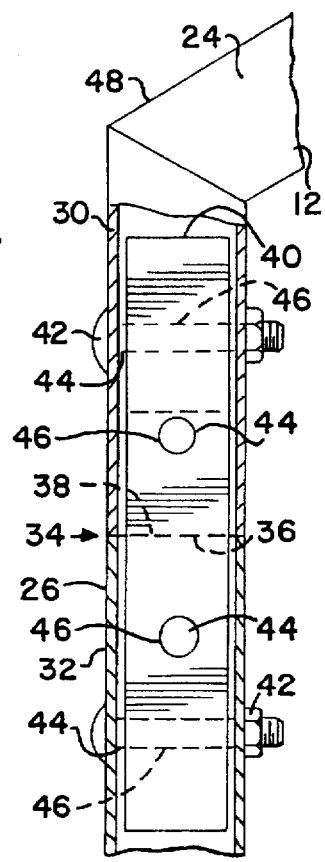

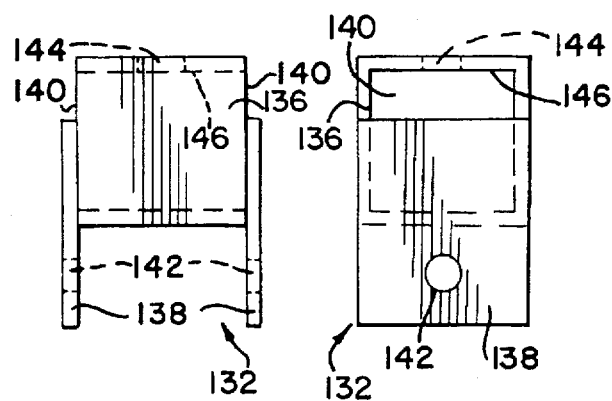
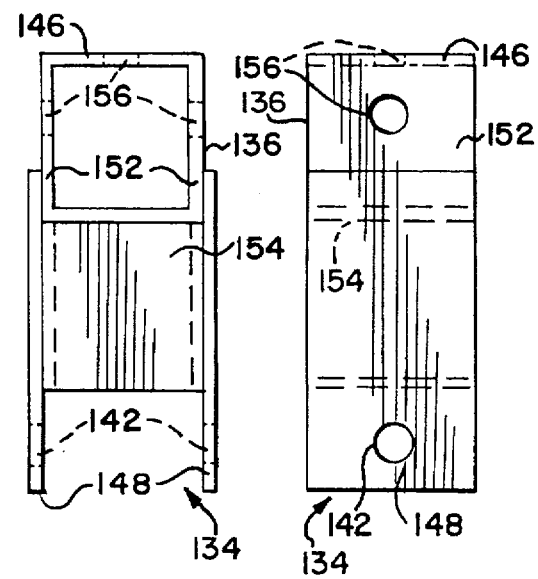
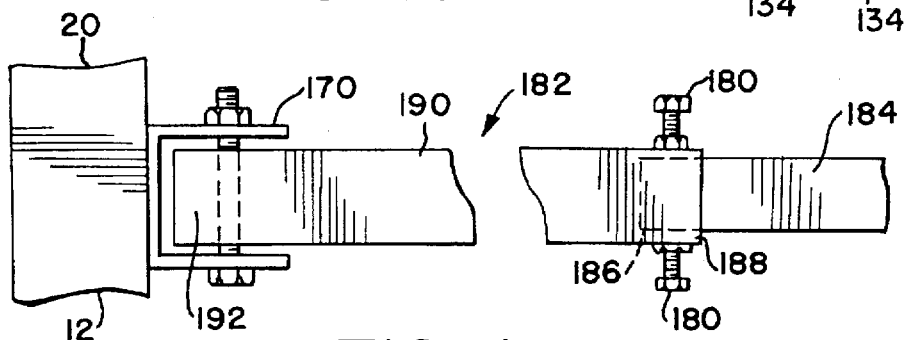
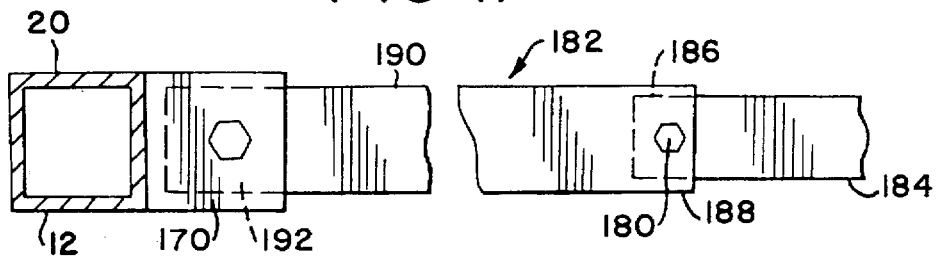
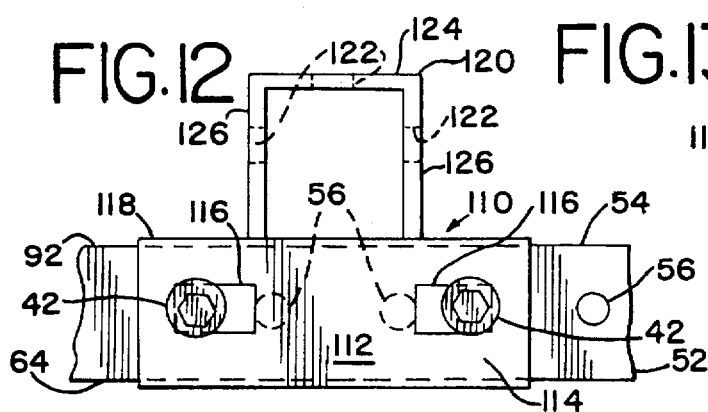
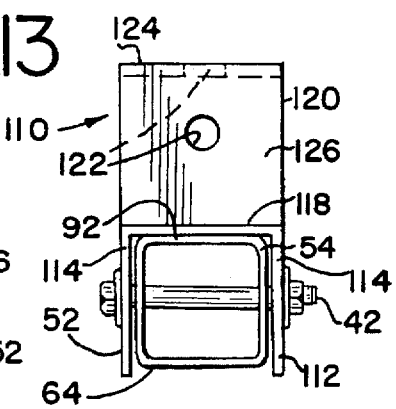

SUPPORT STRUCTURE FOR AUTOMOTIVE BODY REPAIR

BACKGROUND OF THE INVENTION

1. Field of Invention

This invention relates generally to support structures for securing and then positioning an automotive vehicle or a body portion thereof for repair and more particularly to a set of frames which may be used to lift an attached vehicle body and then roll that body to a position that promotes repair.

2. Prior Art

Support structures for holding and then allowing vehicle rotation for repair are well known and have been in use for many years.

One earlier adjustable automobile holder is disclosed in U.S. Pat. No. 1,288,128. This holder includes a pair of spaced apart rocker members. Each rocker member is defined in part by curved side portions connected by a horizontal frame member. Ends of a pair of spaced rail tracks then are carried on the frame members. For use a vehicle is driven up an inclued track and onto the rail tracks. With the vehicle then secured to the holder by sets of stay-rods and vertical standards, the holder may be rolled sideways to expose an underside of the vehicle.

Another support structure for vehicle repair is set out in U.S. Pat. No. 1,507,911. This structure comprises spaced apart circular-shaped frames each having a horizontal cross bar. These cross bars hold ends of a pair of channel-shaped rails for locating tires of a vehicle positioned on the structure. The vehicle is held in place by pairs of fastening devices. Each device comprises a chain having one hooked end that fastens to the vehicle frame and an opposite end that connects with a hooked end of a shank. An opposite end of the shank then extends through a sleeve of a clamp fitted to one of the rails. This opposite shank end then threads into an actuating member.

A more recent device for supporting and tilting a vehicle body is shown in U.S. Pat. No. 4,836,739. This device includes an H-shaped base unit made of square tubing. Extending outwardly and upwardly on an angle from each side of the base unit is an arm. Telescopically projecting from each arm outer end is an arm extension. On an outer end of each arm extension is a vertical plate. Using bolts, the plates of a pair of devices may be secured respectively to opposite sides of a frame or to wheel hubs of a vehicle raised on jacks. With the jacks then removed, the vehicle may be tilted to either side to provide access to an underside of the vehicle.

SUMMARY OF THE INVENTION

Support structure this invention, which is particularly adapted to facilitate vehicle body repair or restoration, comprises a set of frames. Each frame has an octagon shape formed by joining ends of eight elongated members.

Each frame further includes a cross bar assembly having spaced apart sleeve supports adjustably carried by vertical side members of the frames. On each sleeve support is an inwardly extending pin which forms a pivot connection with an end of an elongated center member located between the sleeve supports. Attached to each pivot pin is an L-shaped stop plate for selective engagement with a stop bar on the adjacent end of the center member.

The cross bar assembly further includes a pair of latching mechanisms. Each mechanism includes a spring activated latch pin which aligns with lock openings in opposite sides of the center member and which may selectively align with a slot through an end of the sleeve support pivot pin.

For use a pair of frames are fitted respectively under slightly raised ends of a vehicle body. The frames are positioned so that a bottom member of each frame is located inwardly from the vehicle end and the cross bar assembly aligns with mounting structure on the vehicle. Adjustable mounts carried on the cross bar assembly center member then are attached to the mounting structure of the vehicle body.

With the frames joined to ends of the vehicle body, a top member of one frame is swung upward raising that end of the vehicle body. When this frame reaches a vertical position, the stop bar engages the stop plate to inhibit further frame rotation in that direction. In this vertical position the pivot pin slots align with the center member lock openings allowing the respective latch pins to release through the slots. Upon release, each latch pin and pivot pin slot form an interference fit that inhibits any further rotation of the frame. Bracing then is connected between the raised frame and the vehicle body.

Next the other end of the vehicle is raised in a like manner. With cross bracing then secured between the frames, the now assembled support structure and vehicle body may be rolled over in either direction to facilitate repair work. This rolling movement is regulated by the frame members which form 45 degree incremental stops.

The support structure of this invention provides several advantages of other like support structures known or in use.

A first advantage is that each frame is relatively simple; thus, the support structure is inexpensive. Additionally, a set of frames may be used by a single person or with limited aid from another person. The structure is ideal for amateur, antique automobile restorers, for example, or for use in small body shops where there is little need for sophisticated hoisting equipment.

A second advantage is that the support structure may readily accommodate different vehicle body configurations. The cross bar assembly and cross bar assembly mounts are fully adjustable to facilitate joinder of a body end to a frame and alignment of the center of gravity of the vehicle body with a longitudinal axis of the support structure.

A third advantage is that the frames may be used safely in the environments noted above. The frames divide the weight of a vehicle body into lesser and therefore easier to handle amounts. First note that only one end of a vehicle body is lifted at a time. Additionally, leverage from using the bottom member of the frame as a pivot and the top member of the frame as the point to apply force produces a mechanical advantage gain of two to three times. A 200 pound application force becomes a 500 pound lifting force to raise one end of a 1000 pound vehicle body, for example.

Safety is further advanced in several ways by engagement of the stop plate with the stop bar during lifting. First, further frame rotation in that direction is inhibited. As so located, the frame with its now raised vehicle body end is in a more stable, vertical position. Additionally, in this vertical position the latching mechanisms activate which then inhibit frame rotation in either direction. Lastly, bracing between a frame bottom member and a bottom of a lifted vehicle body end may be attached without an unreasonable risk that the vertically positioned frame could collapse.

Safe use of the support structure also is enhanced by the relative ease for centering the vehicle body as discussed above and for regulating the rolled-over position of the support structure. The frame members form releasable, incremental stops that interrupt rolling movement of the structure. If a vehicle body were sufficiently off center or if the stops were less pronounced, the vehicle body and frames could roll beyond an intended safe point. Rolling safety also is promoted by the bracing discussed above and a longitudinal roof tie rod connecting top members of the frames.

DESCRIPTION OF THE DRAWINGS

FIG. 2 is a front elevational view having a sectional portion showing a portion of a side member and cross bar assembly of one frame of the support structure.

FIG. 3 is a cross sectional view as seen generally along the line 3—3 in FIG. 2.

FIG. 4 is a front elevational view showing in detail a portion of a lower angled member and a bottom member of a frame and bracing carried thereby.

FIG. 5 is a front elevational view having a sectional portion showing a connection between an upper section and a lower section of a frame.

FIG. 6 is a front elevational view of a short extension for a mount of a frame cross bar assembly.

FIG. 7 is a side elevational view of the short extension of FIG. 6.

FIG. 8 is a front elevational view of a long extension for a cross bar assembly mount.

FIG. 9 is a side elevation view of the long extension of FIG. 8.

FIG. 10 is a plan view of an end portion of a roof brace for connecting the frames of FIG. 1.

FIG. 11 is a side elevational view of the roof brace of FIG. 10.

FIG. 12 is a front elevational view showing in detail one mount carried by a center member of a frame cross bar assembly.

FIG. 13 is a side elevational view of the mount and frame cross bar assembly center member of FIG. 12.

DESCRIPTION OF THE PREFERRED EMBODIMENT

Figure 1:
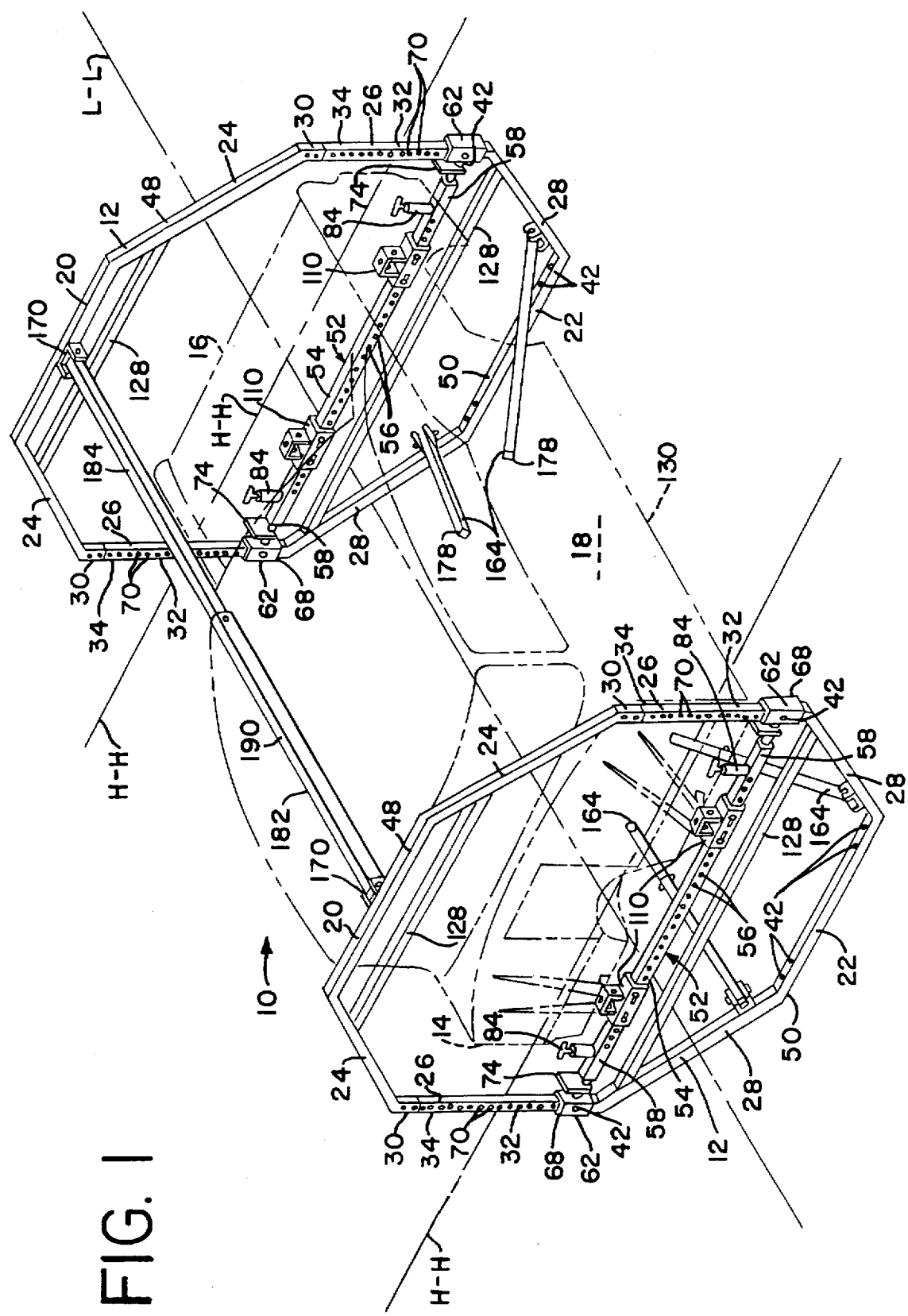
FIG. 1 is a perspective view showing support structure of this invention carrying a vehicle body in a raised position.

Support structure of this invention for vehicle body repair is shown generally in FIG. 1 and designated 10. As shown, the structure 10 comprises a set of spaced apart frames 12 which carry respective front and rear ends 14, 16 of a vehicle body 18.

Each frame 12 comprises eight elongated members, a top and a bottom member 20, 22, a pair of upper angled members 24, a pair of side members 26, and a pair of lower angled members 28. These members 20–28 are joined on respective 45 degree angles so that the support frame 12 has an octagon shape. The preferred material for the members 20–28 is 2 in. square steel tubing.

Each side member 26 is formed having an upper segment 30 and a lower segment 32 joined by releasable connections 34, see FIG. 5. In each connection 34 a bottom end 36 of the upper segment 30 abuts a top end 38 of the lower segment 32. The connection 34 is reinforced by a tubular insert 40 located inside the segments 30, 32. These side member segments 30, 32 and the insert 40 then are held together by four bolt-nut fastener assemblies 42. Two fasteners 42 (not shown) extend through a pair of spaced apart openings 44 which align with a longitudinal axis L—L of the structure 10 and which are located next to and one each side of the segment ends 36, 38. The other pair of fasteners 42 extend through a further pair of spaced apart openings 44 which align with a horizontal axis H—H of the each frame 12 and which are located away from and on each side of the segment ends 36, 38. Concurrently, the fasteners 42 locate in sets of correspondingly aligned openings 46 in the tubular insert 40.

The connections 34 allow each frame 12 to be formed by joining an integral upper frame section 48 and an integral lower frame section 50. The upper section 48 comprises the top member 20, the upper angled members 24, and the side member upper segments 30. The lower section 50 comprises the bottom member 22, the lower angled members 28, and the side member lower segments 32. The frame 10 may be more readily shipped in sections 48, 50 for subsequent field assembly.

Extending between the side members 26 is a cross bar assembly 52, see FIGS. 1–3 and 12, 13. This assembly 52 includes a center member 54 formed with sets of horizontally aligned openings 56 spaced horizontally apart on 1 ½ in. increments.

Ends 58 of the center member 54 form journals respectively for pivot pins 60 of sleeve supports 62. Attached to a bottom side 64 of each center member end 58 is an outwardly extending bar stop 66. Each sleeve assembly 62 then has a vertical sleeve portion 68 slidably fitting respectively about the side member lower segments 32.

As best understood by viewing FIGS. 1 and 2, each side member lower segment 32 is formed with a set of longitudinally aligned openings 70 which are spaced vertically apart on 1½ in. increments.

The vertical location of the cross bar assembly 52 on the side member lower segments 32 may be adjusted and then fixed by a further set of bolt-nut fastener assemblies 42. These fastener assemblies 42 locate in respective, longitudinally aligned sets of openings 72 in each sleeve portion 68 and then through an opening set 70 in the side member lower segments 32.

Referring to FIG. 2 and also FIG. 3, each sleeve support 62 of the cross bar assembly 52 includes an inverted L-shaped lock plate 74. Each lock plate 74 has a vertical locking edge 76 and a semi-circular cutout 78 that fits over a top portion of the pivot pin 60 to facilitate joinder of the lock plates 74 to the pivot pins 60. An inner end 80 of each pivot pin 60 then is formed with a slot 82.

The cross bar assembly 52 further includes a set of latching mechanism 84. This mechanism 84 comprises a cylinder 86 having a bottom end 88 that fits about one opening of a set of aligned openings 90 through a top side 92 and the bottom side 64 of the cross bar assembly center member 54. Inside each cylinder 86 is a coil spring 94 having a lower end 96 compressively engaging a washer 98 carried by a shank portion 100 of a latch pin 102. An upper end 104 of each spring 94 then is held in place by a further washer 98 attached inside a top end 106 of the cylinder 86. On an outer end of the latch pin shank portion 100 is a handle 108.

Referring to FIGS. 1, 12 and 13, on the cross bar assembly center member 54 is a pair of mounts 110. Each mount 110 includes a downwardly facing channel shaped base 112. In an inner and an outer sidewall 114 of each mount base 112 is a pair of aligned, spaced apart slots 116. Attached to a top wall 118 of each mount base 112 and centered thereon is an inverted U-shaped bracket 120. Each bracket 120 is formed with a set of three holes 122. This set includes one hole 122 in a top wall 124 and one hole 122 in each sidewall 126 of the bracket 120.

The mounts 124 may be selectively positioned along the cross bar assembly center member 54. Because the width of and the distance between slots 116 is equal to the spacing of the openings 56, there always are slot-opening alignments. The position of the mounts 110 are affixed by further fasteners 42 extending through the mount base slots 116 and through particular sets of aligning center member openings 56.

Lastly, each frame 12 includes a pair of spaced apart, horizontally positioned cross braces 128. One cross brace 128 is carried by the upper angled members 24; the other cross brace 128 is carried by the lower angled members 28.

For use the frames 12 first are placed horizontally on the ground, floor or other like support surface. Each frame 12 then is slid respectively under the slightly raised front and rear ends 14, 16 of the vehicle body 18. The frames 12 are so positioned to center the vehicle body 18 between the frame side members 26. With the latch pins 102 of the mechanisms 84 retracted allowing the mounts 110 to be vertically positioned, the mounts 110 are aligned with mounting structure on the vehicle body 18. It should be understood that the vehicle mounting structure will vary with the configuration and condition of the body 18. In some cases the mounting structure may be brackets, plates, bars or like elements which are welded to an underside 130 of the body 18 by the support structure user.

Additionally, the position of the cross bar assemblies 54 on the frame side members 26 are adjusted so that the center of gravity of the vehicle body 18 proximately aligns with the structure longitudinal axis L—L. Typically, the center of gravity is located above the vehicle underside 130 at a distance equal to about ⅓ of the vehicle body height. Ideally, the center of gravity of the vehicle body 12 is centered within the structure 10.

If dimensional variations of the vehicle body 18 are such that the brackets 120 on the cross bar mounts 110 are not readily attachable to the body mounting structure with the body 18 centered as noted, this problem may be solved by using short mount extensions 132, see FIGS. 6 and 7, or long mount extensions 134, see FIGS. 8 and 9. These mount extensions 132, 134 serve as linking structure between the mount brackets 120 and the vehicle body 18. Note the short extension 132 also may be attached to the long extension 134 if a still further increase in length is required.

The short extension 132 includes a tubular upper block 136. Attached to the block 136 are side mounting plates 138 which partially cover open ends 140 of the block 136. The plates 138 then extend downward below the block 136 for locating aligned openings 142. A further opening 144 is provided in a top wall 146 of the block 136.

The long extension 134 also includes a tubular upper block 136. In this case mounting plates 148 are attached one each to a lower portion of each sidewall 152 of this block 136 and to a middle block 154 located immediately below the upper block 136. The plates 148 then extend downward below the middle block 154 for aligned openings 142. Additional openings 156 are provided in each sidewall 152 and the top wall 146 of the upper block 136 of the long extension 134.

With the front and rear end 14, 16 of vehicle body 18 now attached to the respective cross bar mount brackets 120 of each frame 12, the top member 20 of the frame 12 attached to the front vehicle end 14 is lifted upward, for example. During lifting, the frame 12 rotates clockwise with the frame bottom member 22 functioning as a sliding fulcrum. As seen in FIG. 4, heads 160 of fastening bolts 42 carried by the bottom member 22 act as glides to reduce frictional resistance to movement of the frame bottom member 22. Casters, not shown, also may be used for this purpose. Note that during rotation of the frame 12, which concurrently raises the cross bar assembly 52, the center member 54 of the cross bar assembly 52 does not rotate and remains in a substantially torsion-free state.

When the frame 12 has been raised to a vertical position, the locking edge 76 of each locking plate 74 engages the respective bar stops 66 to prevent further clockwise frame rotation. In this now vertical location the shank portion 100 of each retracted latch pin 102 aligns respectively with the end slots 82 of the pivot pins 60. The springs 94 of the latching mechanisms 84 advance the pin shank portions 100 through the slots 82 and the respective openings 90 in the center member bottom side 64. A cotter pin, not shown, may be inserted through an opening 162 in an bottom end of each latch pin 102, see FIG. 2. The latch pins 102 in the pivot pin slots 82 form interference fits that inhibit any frame-cross bar center member rotation.

The frame 12, now in a vertical and locked condition, is ready for additional bracing. To reinforce the connection between the frame 12 and body front end 14, a pair of bottom braces or kickers 164 are attached to the underside 130 of the vehicle body 18, see FIG. 4. Each kicker 164 includes a lower tube 166 having an outer end 168 pivotally carried by a U-shaped bracket 170 attached respectively to the lower angled members 28. In an inner end 172 of each lower tube 166 is a telescopically disposed outer end 174 of an upper tube 176. With inner ends 178 of the upper tubes 176 attached to further mounting structure of the vehicle body 18 set screws 180 are used to lock the tubes 166, 176 together.

With the front frame bottom kickers 164 now locked in place, the other frame 12 is used to raise the rear end 16 of the vehicle body 18 in a like manner. Once raised, another set of like kickers 164 are attached to the vehicle body 18.

Further support structure rigidity is provided by a roof brace or kicker 182, see FIGS. 1, 10, and 11. The roof kicker 182 comprises a first tube 184 having an inner end 186 telescopically disposed in an inner end 188 of a second tube 190. Outer ends 192 of the tubes 184, 190 then are pivotally carried by further U-shaped brackets 170 attached respectively to the top member 20 of each frame 12. With the length of the roof kicker 182 adjusted to the distance between frames 12, further set screws 180 carried by the second tube inner end 188 are used to prevent relative tube movement.

The support structure 10 and the vehicle body 18 carried thereby now may be safely rolled over, i.e., rotated about the longitudinal axis L—L, to provide better access to a lower portion and the underneath 130 of the body 18. During any such rotation the frame members 20–28 form 45 degree incremental stops for positioning the structure 10 and vehicle body 12 carried thereby.

While an embodiment, uses and advantages of this invention have been shown and discussed, it should be understood that this invention is limited only by the scope of the claims. Those skilled in the art will appreciate that various modifications or changes may be made without departing from the scope and spirit of the invention, and these modifications and changes may result in further uses and advantages.

What I claim is:

1. Support structure particularly adapted for holding an automotive body for restoration or repair of said vehicle body, said structure including a first frame comprising:

a set of elongated members having ends joined to fit about an end of said vehicle with said member set including a pair of spaced apart side members located to fit on respective sides of said vehicle end, and said members forming a lower section of said frame for ready placement under said vehicle body end with said vehicle body end being raised a short distance above a surface supporting said frame, a cross bar assembly having pivot means carried respectively by said side members and a center member operatively connected to said pivot means to allow rotational movement between said pivot means and said center member, and mount means carried by said cross bar assembly for connecting said cross bar assembly to said vehicle body end, wherein said frame lower section may be placed underneath said vehicle body end to align said mount means with said mounting structure on said vehicle body for joinder thereto, and said joinder remaining substantially torsion-free when an upper section of said frame is raised to rotate said frame from said position underneath said vehicle body end to a vertical position.

2. Support structure as defined by claim 1 and further characterized by said first frame including, latch means having a disengaged state to allow free rotation between said pivot means and said cross bar assembly center member, and having an engaged state to inhibit said rotation.

3. Support structure as defined by claim 2 and further characterized by said latch means including, a cylinder positioned about an opening in a top side of said cross bar assembly center member, a spring carried in said cylinder, a latch pin having a shank portion operatively connected to said spring with said pin shank portion extending through said center member opening, and said pivot means including a pivot pin formed with a slot, wherein alignment of said pivot pin slot with said center member opening allows said spring to advance said latch pin shank portion into said slot to lock in place said pivot means and said cross bar assembly center member.

4. Support structure as defined by claim 1 and further characterized by said mount means including a mount defined by, a downward facing channel shaped base prepared to slidably fit on said cross bar assembly center member with sidewalls of said base formed with sets of aligning slots, and a bracket attached to a top wall of said base with said bracket formed with openings for connecting said mount means to said vehicle body mounting structure.

5. Support structure as defined by claim 4 and further characterized by including, extension means attachable to said mount means bracket to provide a structural link between said mount means bracket and said vehicle body mounting structure, wherein said extension means may be used to connect said vehicle body to said support structure in a position that places the center of gravity of said body in substantial alignment with a center of said structure.

6. Support structure as defined by claim 1 and further characterized by said first frame including, stop means allowing selective rotational movement in a first direction between said pivot means and said cross bar assembly center member until said movement results in engagement of said center member with said stop means which engagement then inhibits said movement.

7. Support structure as defined by claim 1 and further characterized by including, a second frame substantial the same as said first frame, and an adjustable roof brace having ends attachable to respective top members of said frames, wherein said second frame may be attached to an opposite end of said vehicle body, said opposite body end raised to a level of said body other end, and said roof brace attached to said frames to add rigidity to said frame-body connections.

8. Support structure as defined by claim 1 and further characterized by said first frame including an upper section, said lower section joined to said upper section by releasable connections, and said releasable connections defined by respective bottom ends of upper segments of said side members abutting top ends of lower segments of said side members, inserts located inside said segments and extending to each side of said segments ends, and fasteners positioned in openings in said inserts and in said side member segments, wherein said upper section and said lower section may be shipped individually for subsequent field assembly into said frame.

9. A frame particularly adapted for lifting and then holding an end of a vehicle body, said frame comprising:

a set of elongated members having ends joined respectively on an angle to form sets of incremental stops for regulation of rolling rotation of said frame in a vertical position, and said member set including a pair of spaced apart side members located to fit on respective sides of said vehicle body end, a cross bar assembly having spaced apart sleeve supports slidably carried one each by said side members of said frame with said sleeve supports connected by a center member having ends carried respectively by a pivot pin of each said sleeve support, a latch mechanism carried by said cross bar assembly and including a spring activated latching pin that may move through a slot in one said pivot pin upon alignment of said pivot pin slot with said latch pin, a pair of mounts each having a base slidably fitting on said cross bar assembly member and a bracket attached to said base for ready connection to mounting structure of said vehicle body, and a kicker brace having on outer end pivotally attached to a lower section of said frame, and an inner end prepared for attachment to further mounting structure of said vehicle body, wherein with a position of said cross bar assembly fixed on said side members of said frame, said vehicle body attached to said cross bar assembly mounting brackets, an upper section of said frame raised to rotate said frame to said vertical position, and said latching mechanism activated to maintain this vertical position, said kicker brace may be attached to said vehicle body without undue risk of said frame collapsing.

10. A frame as defined by claim 9 and further characterized by said cross bar assembly including, a stop plate having a locking edge with said plate carried by one said pivot pin, and a stop bar carried on said end of said cross bar assembly center member adjacent to said stop plate, wherein engagement of said stop plate locking edge with said stop bar promotes activation of said latching mechanism.

11. Support structure to facilitate automotive body repair, said structure having a frame comprising a cross bar assembly including:

- a pair of spaced apart sleeve means prepared for adjustable positioning on members of said frame of said support structure,
- a center member having ends pivotally connecting with said sleeve means,
- stop means carried by said cross bar assembly to limit the degree of rotational movement between said frame and said center member, and
- a latching mechanism carried by said cross bar assembly, said mechanism having an operative latching pin that may form a selective interference fit between said frame and said center member to inhibit rotational movement therebetween, wherein for use said cross bar assembly is connected to an end of said automotive body, and said frame then vertically positioned to raise said automotive body end for said repair.

12. Support structure as defined by claim 11 and further characterized by said stop means including,

- a stop plate being attached to a pivot pin of said sleeve means and having a locking edge, and
- a stop bar being attached to a bottom side of said center member, wherein during vertical positioning of said frame, said stop plate locking edge engages said stop bar to maintain said vertical position and promote release of said latching pin to form said interference fit.

* * * * *